United States Patent
Parsons et al.

(10) Patent No.: US 11,668,251 B2
(45) Date of Patent: Jun. 6, 2023

(54) ACTUATOR WITH THERMAL PROTECTION

(71) Applicant: HONEYWELL INTERNATIONAL INC., Charlotte, NC (US)

(72) Inventors: Abigail Parsons, South Bend, IN (US); Charles Walejewski, South Bend, IN (US); Sammuel Tillich, South Bend, IN (US); Michael Gogola, South Bend, IN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 198 days.

(21) Appl. No.: 17/160,983

(22) Filed: Jan. 28, 2021

(65) Prior Publication Data
US 2022/0235714 A1    Jul. 28, 2022

(51) Int. Cl.
*F02C 9/20*    (2006.01)
*F15B 13/04*    (2006.01)

(52) U.S. Cl.
CPC ............ *F02C 9/20* (2013.01); *F15B 13/0402* (2013.01); *F05D 2220/32* (2013.01); *F05D 2270/64* (2013.01); *F15B 2211/66* (2013.01)

(58) Field of Classification Search
CPC .......... F05D 2270/64; F02C 6/08; F02C 9/18; F02C 9/20
See application file for complete search history.

(56) References Cited

U.S. PATENT DOCUMENTS

| 3,517,683 | A | | 6/1970 | Chandler |
| 3,927,791 | A | | 12/1975 | Hershberger |
| 3,991,804 | A | | 11/1976 | Wilson |
| 4,628,953 | A | | 12/1986 | Correll et al. |
| 4,744,382 | A | | 5/1988 | Visnic et al. |
| 4,989,627 | A | | 2/1991 | McAfee |
| 5,031,790 | A | * | 7/1991 | Keller ................ B60K 15/0406 220/301 |
| 5,099,869 | A | | 3/1992 | Derouet et al. |
| 6,367,499 | B2 | | 4/2002 | Taku |
| 7,249,929 | B2 | * | 7/2007 | Cummings ........... F04D 29/545 29/889.22 |
| 7,462,100 | B2 | | 12/2008 | VanWormer |

(Continued)

FOREIGN PATENT DOCUMENTS

| CN | 202927186 U | 5/2013 |
| EP | 0870723 A2 | 10/1998 |
| GB | 2286804 A | 8/1995 |

*Primary Examiner* — Todd E Manahan
*Assistant Examiner* — Thuyhang N Nguyen
(74) *Attorney, Agent, or Firm* — Lorenz & Kopf LLP

(57) ABSTRACT

An actuator includes a housing that defines a first inlet to receive a fluid, a second inlet to receive the fluid and a chamber. The actuator includes an actuator rod movably coupled to the housing. The actuator rod includes a head. A first face of the head is responsive to the fluid from the first inlet, and a second face of the head is responsive to the fluid from the second inlet to move the actuator rod. The head defines at least one cross-bore. The actuator includes at least one plug coupled to the cross-bore to inhibit a flow of the fluid through the cross-bore in a first state such that the plug fluidly isolates the fluid from the first inlet from the fluid from the second inlet. The plug is to enable the flow of the fluid through the at least one plug in a second state.

20 Claims, 6 Drawing Sheets

(56) References Cited

U.S. PATENT DOCUMENTS

| | | | |
|---|---|---|---|
| 7,540,144 B2* | 6/2009 | Makuszewski | F04D 27/023 |
| | | | 60/785 |
| 8,141,574 B2 | 3/2012 | Weatherly et al. | |
| 8,327,868 B2* | 12/2012 | Lammers | F17C 13/04 |
| | | | 220/89.4 |
| 9,217,441 B2 | 12/2015 | Conrad et al. | |
| 9,562,619 B2 | 2/2017 | Kojima et al. | |
| 9,657,647 B2* | 5/2017 | Mackin | F04D 27/009 |
| 11,098,677 B2* | 8/2021 | Stambaugh | F02K 1/763 |

* cited by examiner

ACTUATOR WITH THERMAL PROTECTION

TECHNICAL FIELD

The present disclosure generally relates to actuators, and more particularly relates to a fuel hydraulic or hydraulic actuator with thermal protection.

BACKGROUND

Gas turbine engines may be employed to power various devices. For example, a gas turbine engine may be employed to power a vehicle, such as an aircraft. Generally, gas turbine engines include various components that may be controlled by an actuator. For example, one or more inlet guide vanes may be moved by an actuator to a desired position to adjust flow through a portion of the gas turbine engine. In one example, the actuator may be a fuel hydraulic or hydraulic actuator that is responsive to a pressurized fluid. In the example of an aircraft, an actuator in contact with certain fluids has requirements for thermal protection. In certain instances, thermal insulation may be applied to the external surfaces of the actuator to provide thermal protection. The use of thermal insulation, however, increases a weight of the actuator, requires maintenance, and may make the actuator difficult to handle for assembly into the gas turbine engine and/or aircraft. In certain instances, the actuator may leak internally between pressure zones to provide thermal protection. The leaking of the actuator, however, results in an increased load on a pump associated with the actuator and may render a position of the actuator more difficult to control precisely.

Accordingly, it is desirable to provide an actuator with thermal protection, in which the thermal protection does not significantly increase a weight of the actuator or require additional maintenance for the actuator while in service. Moreover, it is desirable to provide a leakproof actuator with thermal protection that provides ease of handling for assembly into the gas turbine engine and/or aircraft, and enables precise positioning of the actuator during normal operation. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an actuator. The actuator includes a housing that defines a first inlet configured to receive a fluid, a second inlet configured to receive the fluid and a chamber fluidly coupled to the first inlet and the second inlet. The actuator includes an actuator rod movably coupled to the housing. The actuator rod includes a head movably disposed in the chamber, and the head has a first face opposite a second face. The first face is configured to be responsive to the fluid from the first inlet to move the actuator rod relative to the housing, and the second face is configured to be responsive to the fluid from the second inlet to move the actuator rod relative to the housing. The head defines at least one cross-bore that extends through the first face and the second face. The actuator includes at least one plug coupled to the at least one cross-bore configured to inhibit a flow of the fluid through the at least one cross-bore in a first state such that the at least one plug fluidly isolates the fluid from the first inlet from the fluid from the second inlet within the chamber in the first state. The at least one plug is configured to enable the flow of the fluid through the at least one plug in a second state.

The actuator includes a first fluid source configured to supply the fluid at a first pressure, a second fluid source configured to supply the fluid at a second pressure and a valve fluidly coupled to the first fluid source, the second fluid source, the first inlet and the second inlet. The valve is configured to supply the fluid at one of the first pressure and the second pressure to the first inlet, and to supply the fluid at the other of the first pressure and the second pressure to the second inlet. The second pressure is different than the first pressure. The at least one plug transitions from the first state to the second state based on a temperature of the actuator rod. The at least one plug is offset from a longitudinal axis of the actuator rod and defines a central plug bore, and a eutectic material is disposed in the central plug bore in the first state, and in the second state, the eutectic material is removed to enable the flow of the fluid through the central plug bore. The at least one plug includes a plug head and a plug shaft, and the plug shaft cooperates with the at least one cross-bore to retain the at least one plug within the at least one cross-bore. The plug head is configured to be in contact with the fluid from the first inlet, and the plug shaft is configured to be in contact with the fluid from the second inlet. The at least one cross-bore defines a plurality of threads between the first face and the second face, and the at least one plug includes a second plurality of threads to couple the at least one plug to the at least one cross-bore. The central plug bore transitions from a first diameter to a second diameter within the plug head, and the second diameter is greater than the first diameter to retain the eutectic material within the central plug bore. The at least one cross-bore has a first diameter at the first face, a second diameter at the second face, and the second diameter is different than the first diameter to retain the eutectic material within the central plug bore. The second plurality of threads are defined on the at least one plug on a portion of the at least one plug that has a diameter that is different than an adjacent portion of the at least one plug. The second diameter is less than the first diameter. The second face includes an annular protrusion that extends axially, and the at least one cross-bore is defined through the first face and extends through the annular protrusion of the second face. The actuator includes a sensor, and the actuator rod includes a shaft coupled to the head, with a central bore defined through the actuator rod from the head toward an end of the shaft. The sensor is at least partially received within the central bore. The housing includes a drain chamber defined within the housing proximate the chamber that is configured to receive the fluid from the chamber and a drain outlet is fluidly coupled to the drain chamber to drain the fluid from the housing. The actuator rod includes a shaft coupled to the head, and the shaft includes a coupling feature configured to couple to a component associated with a gas turbine engine.

Also provided is an actuator system for a gas turbine engine. The actuator system includes a first fluid source that is configured to supply a fluid at a first pressure, and a second fluid source that is configured to supply the fluid at a second pressure, the second pressure different than the first pressure. The actuator system includes an actuator having a housing that defines a first inlet configured to receive the fluid, a second inlet configured to receive the fluid and a chamber fluidly coupled to the first inlet and the second inlet. The actuator includes an actuator rod movably coupled to the housing that extends along a longitudinal axis. The actuator rod includes a head movably disposed in the chamber, and the head has a first face opposite a second face.

The first face is configured to be responsive to the fluid from the first inlet to move the actuator rod relative to the housing, and the second face is configured to be responsive to the fluid from the second inlet to move the actuator rod relative to the housing. The head defines at least one cross-bore that extends through the first face and the second face. The at least one cross-bore extends along an axis parallel to the longitudinal axis. The actuator includes at least one plug coupled to the at least one cross-bore that is configured to inhibit a flow of the fluid through the at least one cross-bore in a first state such that the at least one plug fluidly isolates the fluid from the first inlet from the fluid from the second inlet within the chamber in the first state. The at least one plug is configured to enable the flow of at least one of the fluid through the at least one plug in a second state and the at least one plug transitions from the first state to the second state based on a temperature of the actuator rod.

The at least one plug includes a plug head, a plug shaft and defines a central plug bore that extends through the at least one plug from the plug head to the plug shaft. A eutectic material is disposed in the central plug bore so as to extend through the central plug bore from the plug head to the plug shaft in the first state, and in the second state, the eutectic material is removed to enable the flow of the fluid through the central plug bore. The at least one cross-bore has a first diameter at the first face, a second diameter at the second face, and the second diameter is less than the first diameter to retain the eutectic material within the central plug bore. The plug head is configured to be in contact with the fluid from the first inlet, the plug shaft is configured to be in contact with the fluid from the second inlet. The central plug bore transitions from a first diameter to a second diameter within the plug head, and the second diameter is greater than the first diameter to retain the eutectic material within the central plug bore.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
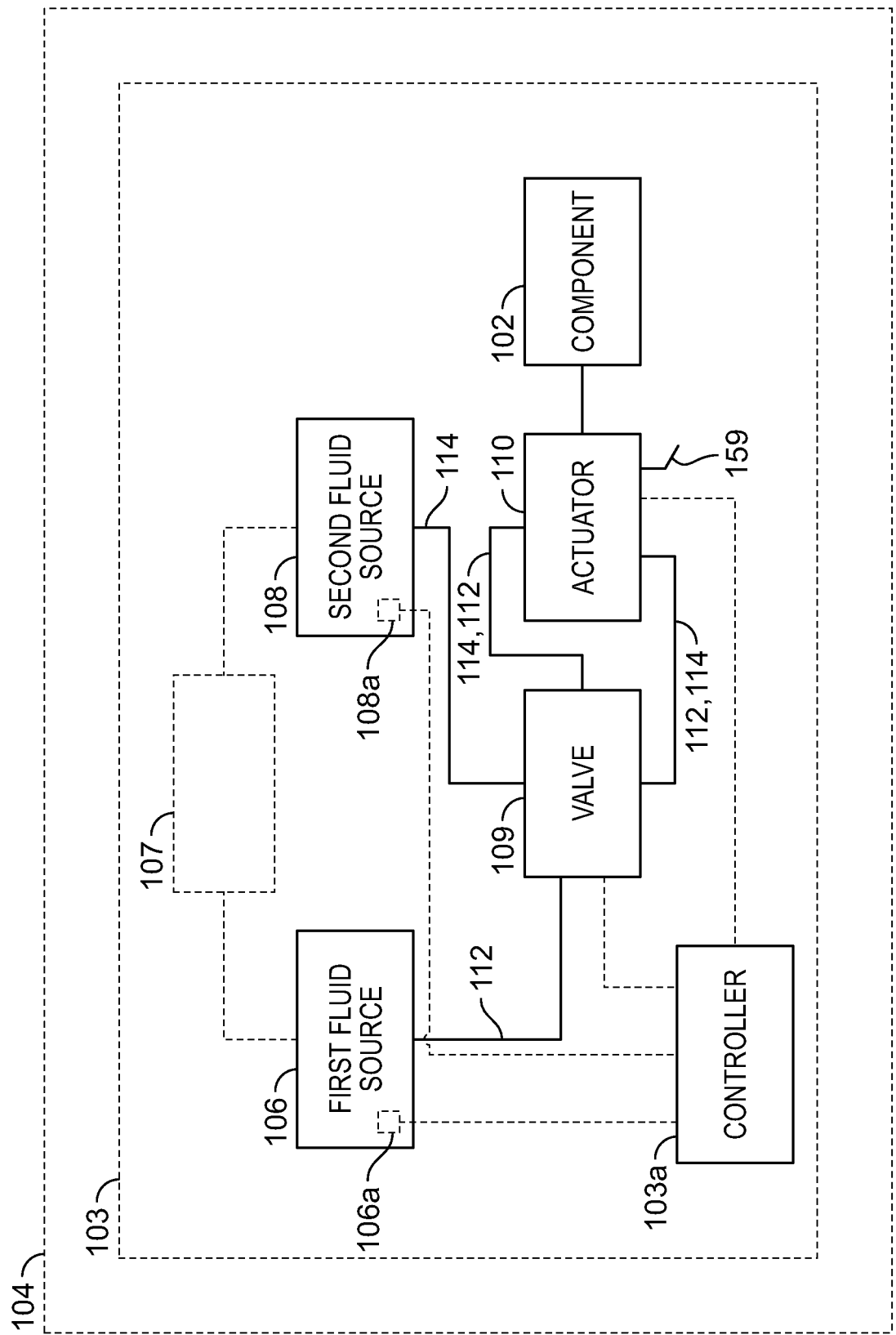
FIG. 1 is a functional block diagram of an exemplary actuator system that includes an actuator with thermal protection in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of actuator that would benefit from having thermal protection that is leak-proof in a first state, and the hydraulic actuator described herein for use with a gas turbine engine of a vehicle is merely one exemplary embodiment according to the present disclosure. In addition, while the actuator is described herein as being used with a gas turbine engine onboard a vehicle, such as an aircraft, rotorcraft, automobile, and the like, the various teachings of the present disclosure can be used with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

With reference to FIG. 1, a functional block diagram of an actuator system 100 for controlling a component 102 associated with a gas turbine engine 103 of a vehicle 104, such as an aircraft is shown. In one example, the component 102 is a variable inlet guide vane, and the actuator system 100 is configured to control a position of the variable inlet guide vane. In other examples, the actuator system 100 may be configured to control a position of a variable compressor blade, a position of a flap (opened, closed and positions in-between), a position of a door (opened, closed and positions in-between), etc. The gas turbine engine 103 may comprise any suitable gas turbine engine 103, including, but not limited to a non-propulsive engine, such as an Auxiliary Power Unit (APU) deployed onboard the vehicle 104, a turboprop gas turbine engine associated with the vehicle 104, an industrial power generator, etc. As the gas turbine engine 103 may be any suitable gas turbine engine for use with the actuator system 100, the gas turbine engine 103 will not be discussed in great detail herein.

In one example, the actuator system 100 includes a first fluid source 106, a second fluid source 108, a valve 109 and an actuator 110. As will be discussed herein, the actuator 110 is responsive to pressurized fluid from the valve 109 from the first fluid source 106 and the second fluid source 108 to control or adjust a position of the component 102. As will also be discussed, in a first state, the actuator 110 is leak-proof or configured fluidly isolate a first fluid 112 provided by the first fluid source 106 and received from the valve 109 from a second fluid 114 provided by the second fluid source 108 and received from the valve 109. Stated another way, in the first state, the actuator 110 is configured to maintain two discrete pressure zones 138a, 138b within a chamber 138 associated with the actuator 110 by fluidly isolating the fluid 112, 114 in the first pressure zone 138a from the fluid 112, 114 in the second pressure zone 138b such that the actuator 110 is leakproof. In a second state, the actuator 110 is configured to enable a bi-directional flow of the fluid 112, 114 between the pressure zones 138a, 138b to provide cooling as the fluid 112, 114 at the first fluid source 106 and the second fluid source 108, respectively, has a lower temperature than the actuator 110. The cooling flow through the actuator 110 in the second state assists in thermally protecting components of the actuator 110, including, but not limited to, one or more seals 116 (FIG. 3) associated with the actuator 110.

The first fluid source 106 is fluidly coupled to the valve 109 via a conduit, tubing, hose, etc., and associated couplings, and is fluidly coupled from the valve 109 to the actuator 110 via a conduit, tubing, hose, etc., and associated couplings. The first fluid source 106 supplies the first fluid 112 to the valve 109 at a first pressure. In one example, the first fluid 112 is a fuel associated with the vehicle 104, such as a jet fuel, which is supplied at the first pressure of about 10 pounds per square inch gauge (psig) to more than about 200 pounds per square inch gauge (psig). In one example, the first fluid source 106 includes a first pump 106a that may be in fluid communication with a reservoir or tank 107 that stores a predetermined amount of the fluid. The amount of fluid supplied to the actuator 110 via the first fluid source 106 is controlled by the valve 109 associated with the gas turbine engine 103, which is responsive to a controller 103a associated with the gas turbine engine 103, such as a full authority digital engine control (FADEC). The controller 103a includes a processor and non-transitory memory capable of executing instructions to control the operation of the gas turbine engine 103 and associated systems, including the amount of fluid supplied to the actuator 110 by the first fluid source 106 and the second fluid source 108. The first pump 106a associated with the first fluid source 106 is responsive to one or more control signals from the controller 103a to supply the valve 109 with a predetermined amount of the first fluid 112 at the first pressure to adjust the position of the component 102 to a predetermined position.

The second fluid source 108 is fluidly coupled to the valve 109 via a conduit, tubing, hose, etc., and associated couplings, and is fluidly coupled from the valve 109 to the actuator 110 via a conduit, tubing, hose, etc., and associated couplings. The second fluid source 108 supplies the second fluid 114 to the actuator 110 at a second pressure, which is different than the first pressure. In one example, the second fluid 114 is a fuel associated with the vehicle 104, such as a jet fuel, which is supplied at the second pressure of about 10 pounds per square inch gauge (psig) to more than about 200 pounds per square inch gauge (psig). Generally, the second pressure may be greater than or less than the first pressure depending on the direction of the load that needs to be created by the actuator 110. Thus, in this example, the first fluid 112 and the second fluid 114 may be the same type of fluid, for example, jet fuel, but are described herein as the first fluid 112 and the second fluid 114 due to the difference in pressures between the first fluid 112 and the second fluid 114. In one example, the second fluid source 108 includes a second pump 108a and that may be in fluid communication with the reservoir or tank 107 that stores the predetermined amount of the fluid. The amount of fluid supplied to the actuator 110 via the second fluid source 108 is controlled by the valve 109 associated with the gas turbine engine 103, which is responsive to the controller 103a. The second pump 108a associated with the second fluid source 108 is responsive to one or more control signals from the controller 103a to supply the valve 109 with a predetermined amount of the second fluid 114 at the second pressure to adjust the position of the component 102 to the predetermined position.

The valve 109 is fluidly coupled to or in fluid communication with the first fluid source 106, the second fluid source 108, a first inlet 130 of the actuator 110 and a second inlet 132 of the actuator 110. The valve 109 is responsive to one or more control signals from the controller 103a to supply the first fluid 112 to the first inlet 130 or the second inlet 132, and to supply the second fluid 114 to the other of the first inlet 130 and the second inlet 132. Stated another way, in one example, the application of the first fluid 112 to the first inlet 130 and the second fluid 114 to the second inlet 132 may be used to move an actuator rod 122 of the actuator 110 in a first direction DF (FIG. 3), and the application of the first fluid 112 to the second inlet 132 and the second fluid 114 to the first inlet 130 may be used to move the actuator rod 122 of the actuator 110 in a second direction DR (FIG. 3), which is opposite the first direction. In one example, the valve 109 is an electrohydraulic servo valve, which is in communication with the controller 103a over a suitable communication architecture, such as a bus.

Figure 2:
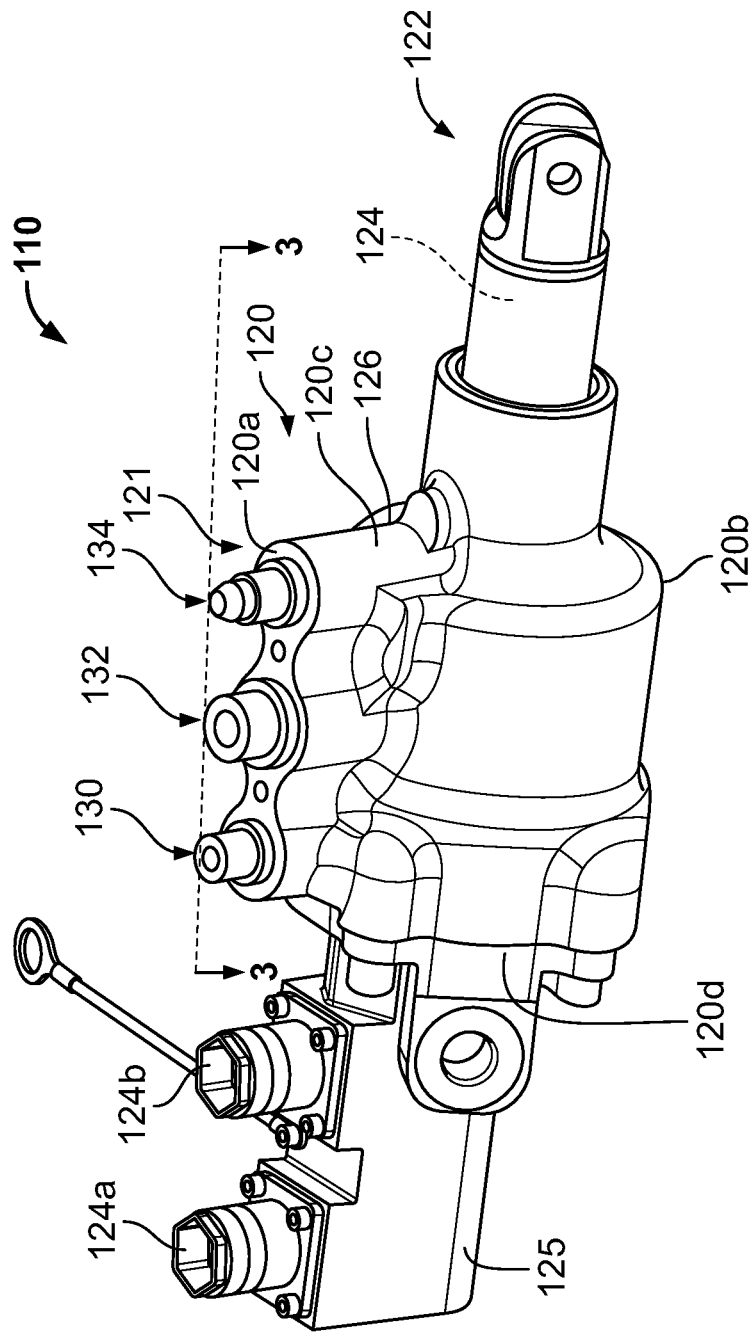
FIG. 2 is a perspective view of the actuator of FIG. 1.
Figure 3:
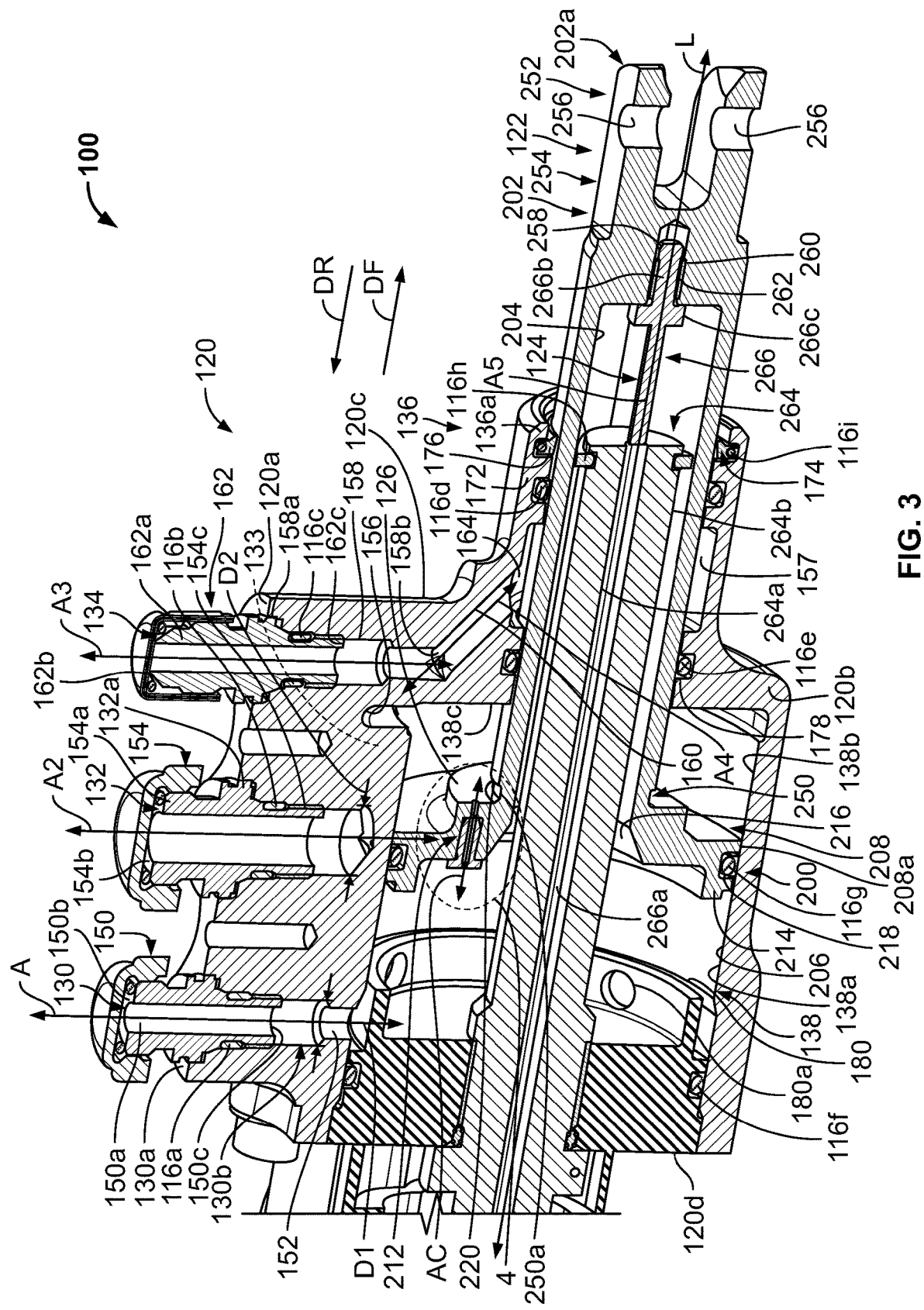
FIG. 3 is a detail cross-sectional view of the actuator of FIG. 2, taken along line 3-3 of FIG. 2, in which at least one plug associated with the actuator is in a first state.

With reference to FIG. 2, the actuator 110 is shown in greater detail. In one example, the actuator 110 includes the seals 116 (FIG. 3), a housing 120, the actuator rod 122, a sensor 124 and at least one plug 126 (FIG. 3). Generally, with reference to FIG. 3, the seals 116 inhibit the flow of the first fluid 112 and the second fluid 114 out of the housing 120, and the seals 116 form an interface between the first fluid 112, the second fluid 114, and air surrounding the housing 120. In one example, the seals 116 are composed of an elastomeric material, including, but not limited to, fluorosilicone and fluorocarbon. Generally, the material from which the seals 116 are composed have an upper service limit temperature above the normal operating temperature of the actuator 110, and in this example, the normal operating temperature of the actuator 110 is about 200 degrees Fahrenheit to about 300 degrees Fahrenheit. The actuator 110 includes thermal protection provided by the at least one plug 126 to reduce the temperatures to which the seals 116 are exposed by providing cooling flow in the second state. This extends a life of the seals 116.

The housing 120 may be composed of metal, metal alloy or ceramic, and may be cast, forged, machined, additively manufactured, etc. In one example, the housing 120 includes the first inlet 130, the second inlet 132, a drain outlet 134, a flange 136 and defines the chamber 138. The first inlet 130, the second inlet 132 and the drain outlet 134 may be defined on a first side 120a of the housing 120, which is opposite a second side 120b. The flange 136 is defined at a second end 120c of the housing 120, which is opposite a first end 120d of the housing 120. The housing 120 is substantially cylindrical, and includes a protrusion 121 along the first side 120a that defines the first inlet 130, the second inlet 132 and the drain outlet 134.

The first inlet 130 is defined through the housing 120, and extends along an axis A, which is substantially perpendicular to a longitudinal axis L of the actuator rod 122. The first inlet 130 is cylindrical, and is generally symmetric about the axis A. The first inlet 130 fluidly couples the first fluid 112 or the second fluid 114 from the valve 109 (FIG. 1) to the first pressure zone 138a of the chamber 138. In one example, the first inlet 130 may be tapered along the axis A from the first side 120a to the chamber 138. In this example, the first inlet 130 includes a coupling 150. The first inlet 130 of the housing 120 may include a plurality of threads, which engage with a plurality of threads defined about an outer circumference of the coupling 150 to couple or connect the coupling 150 to the housing 120. The coupling 150 may also be press-fit into the first inlet 130, if desired. The coupling 150 provides a fitting for connecting the conduit, hose, etc. from the valve 109 to the first inlet 130 to enable fluid communication between the first inlet 130 and the valve 109. Generally, the coupling 150 extends from a first end 130a of the first inlet 130 toward an opposite, second end 130b of the first inlet 130. The coupling 150 defines a cylindrical passageway 150a, which extends from an inlet 150b of the coupling 150 to an outlet 150c of the coupling 150, with the outlet 150c fluidly coupled to a second end 130b of the first inlet 130. The second end 130b of the first inlet 130 defines an opening 152, which fluidly couples the first inlet 130 to the chamber 138. One seal 116a of the seals 116 may be coupled about the coupling 150 to inhibit the flow of the first fluid 112 around the coupling 150 and out of the housing 120.

The second inlet 132 is defined through the housing 120, and extends along an axis A2, which is substantially perpendicular to the longitudinal axis L of the actuator rod 122. The second inlet 132 is cylindrical, and is generally symmetric about the axis A2. The second inlet 132 fluidly couples the first fluid 112 or the second fluid 114 from the valve 109 (FIG. 1) to the second pressure zone 138b of the chamber 138. In one example, the second inlet 132 is substantially cylindrical along the axis A2 from the first side 120a to the chamber 138. In this example, the second inlet 132 includes a second coupling 154. The second inlet 132 of the housing 120 may include a plurality of threads, which engage with a plurality of threads defined about an outer circumference of the second coupling 154 to couple or connect the second coupling 154 to the housing 120. The second coupling 154 may also be press-fit into the second inlet 132, if desired. The second coupling 154 provides a fitting for connecting the conduit, hose, etc. from the valve 109 to the second inlet 132 to enable fluid communication between the second inlet 132 and the valve 109. Generally, the second coupling 154 extends from a first end 132a of the second inlet 132 toward an opposite, second end 132b of the second inlet 132. The second coupling 154 defines a cylindrical passageway 154a, which extends from an inlet 154b of the second coupling 154 to an outlet 154c of the second coupling 154, with the outlet 154c fluidly coupled to the second end 132b of the second inlet 132. The second end 132b of the second inlet 132 defines an opening 156, which fluidly couples the second inlet 132 to the chamber 138. In this example, a channel 133 fluidly couples the outlet 154c of the second coupling 154 to the opening 156. The channel 133 generally extends along an axis that is substantially parallel to the longitudinal axis. The opening 156 is substantially cylindrical, and is defined proximate an end 138c of the chamber 138. In one example, the second end 132b has a diameter D2, which is different and greater than a diameter D1 of the second end 130b. The larger diameter D2 provides a greater area for the fluid to be received at the second inlet 132, which assists in providing the force to move the actuator rod 122 in the second direction DR. One seal 116b of the seals 116 may be coupled about the second coupling 154 to inhibit the flow of the second fluid 114 around the second coupling 154 and out of the housing 120. It should be noted that in other embodiments, the diameter D1 and the diameter D2 may be the same.

The drain outlet 134 is defined through the housing 120. The drain outlet 134 is fluidly coupled to a flange chamber 157 and a drain conduit 159 (FIG. 1). The drain outlet 134 enables fluid that flows out of the chamber 138 along the actuator rod 122 to be removed from the housing 120 so that the fluid does not flow outside out of the housing 120. In one example, the drain outlet 134 includes a first drain branch 158 and a second drain branch 160. The first drain branch 158 extends along an axis A3, which is substantially perpendicular to the longitudinal axis L of the actuator rod 122. The second drain branch 160 extends along an axis A4, which is substantially transverse to the longitudinal axis L of the actuator rod 122. The second drain branch 160 is defined upstream from the first drain branch 158, and the axis A4 may extend at about a 45 degree angle relative to the axis A3. By extending along the axis A4, the second drain branch 160 reduces an amount of space needed for actuator system 100 by enabling the positioning of the drain outlet 134 adjacent to the first inlet 130 and the second inlet 132.

The first drain branch 158 is cylindrical, and is generally symmetric about the axis A3. The first drain branch 158 may include a step, such that a diameter of the first drain branch 158 proximate the second drain branch 160 is about equal to the diameter of the second drain branch 160, and proximate the first side 120a of the housing 120, a diameter of the first drain branch 158 is different and greater than the diameter of the remainder of the first drain branch 158 and the second drain branch 160. In this example, the second inlet 132 includes a third coupling 162. The first drain branch 158 of the housing 120 may include a plurality of threads, which engage with a plurality of threads defined about an outer circumference of the third coupling 162 to couple or connect the third coupling 162 to the housing 120. The third coupling 162 may also be press-fit into the first drain branch 158, if desired. The third coupling 162 provides a fitting for connecting the drain conduit to the drain outlet 134 to enable fluid communication between the drain outlet 134 and the drain conduit 159 (FIG. 1). Generally, the third coupling 162 extends from a first end 158a of the first drain branch 158 toward an opposite, second end 158b of the first drain branch 158 and ends prior to the step defined in the first drain branch 158. The third coupling 162 defines a cylindrical passageway 162a, which extends from an outlet 162b of the third coupling 162 to an inlet 162c of the third coupling 162, with the inlet 162c fluidly coupled to the first drain branch 158 and the second drain branch 160. One seal 116c of the seals 116 may be coupled about the third coupling 162 to inhibit the flow of the fluid from the drain outlet 134 around the third coupling 162 and out of the housing 120.

The second drain branch 160 is also cylindrical, and is generally symmetric about the axis A4. The second drain branch 160 is fluidly coupled to the first drain branch 158 and to the flange chamber 157. The second drain branch 160 is coupled to the first drain branch 158 at the second end 158b, and extends along the axis A4 from the second end 158b to an opening 164. The opening 164 fluidly couples the drain outlet 134 to the flange chamber 137. It should be noted that while the first inlet 130, the second inlet 132 and the drain outlet 134 are illustrated herein with caps that obstruct the respective inlets 150b, 154b and the outlet 162b, when installed in the gas turbine engine 103, the caps would be removed to fluidly couple the actuator 110 to the valve 109 and to the drain conduit 159 (FIG. 1).

The flange 136 of the housing 120 extends outwardly from the second end 120c of the housing 120. The flange 136 is cylindrical, and has a diameter, which is different and less than, a diameter of the housing 120. The flange 136 is generally sized to correspond with a diameter of the actuator rod 122 so that the flange 136 may assist in guiding the movement of the actuator rod 122 relative to the housing 120. In this example, the flange 136 defines a central bore 170, and includes a bushing 172 and a retaining ring 174. The central bore 170 slidably receives the actuator rod 122. The central bore 170 also receives the bushing 172 and the retaining ring 174. The central bore 170 is defined along an axis A5, which is parallel and coaxial to the longitudinal axis L of the actuator rod 122. The bushing 172 is coupled to the central bore 170 proximate a first end 136a of the flange 136, and the retaining ring 174 is coupled to the central bore 170 so as to be disposed outboard of bushing 172 at the first end 136a of the flange 136. The bushing 172 is any suitable sleeve bushing that enables the relative motion between the actuator rod 122 and the flange 136. One seal 116d of the seals 116 may be disposed within the bushing 172 to inhibit the flow of fluids out of the housing 120. The retaining ring 174 is any suitable retaining device, such as a circular ring composed of a metal or metal alloy. Generally, the retaining ring 174 is retained within a groove 176 defined within the flange 136 at the first end 136a. The groove 176 may also include one of the seals 116i.

The flange chamber 157 is defined within the central bore 170 of the flange 136. The flange chamber 157 is defined between the bushing 172 of the flange 136 and a second bushing 178 coupled to the housing 120 at a second end 136b of the flange 136. The flange chamber 157 receives any fluid that is carried by the actuator rod 122 out of the chamber 138 and into the central bore 170. The flange chamber 157 is in fluid communication with the drain outlet 134. The second bushing 178 is coupled to the housing 120 so as to surround the central bore 170 at the second end 136b of the flange 136. The second bushing 178 is any suitable sleeve bushing that enables the relative motion between the actuator rod 122 and the housing 120. The second bushing 178 may be retained by a groove defined in the housing 120. One seal 116e of the seals 116 may be disposed within the bushing 172 to inhibit the flow of fluids out of the housing 120.

The chamber 138 is fluidly coupled to and in fluid communication with the first inlet 130 and the second inlet 132, and thus, is fluidly coupled to the valve 109 to receive the first fluid 112 from the first fluid source 106 and the second fluid 114 from the second fluid source 108. The chamber 138 is defined in the housing 120 between the first side 120a and the second side 120b, between the second end 120c and the first end 120d, and is enclosed by the housing 120. In one example, the chamber 138 includes a stop 180 defined along the first end 120d. The stop 180 is annular, and extends axially into the chamber 138 to limit the advancement of the actuator rod 122 toward the first end 120d. The stop 180 may define a plurality of bores 180a, which enable the first fluid 112 to flow into the chamber 138. In one example, the stop 180 may be removably coupled to the first end 120d of the housing 120, and one seal 116f of the seals 116 may be disposed about a perimeter of the stop 180 at the interface between the stop 180 and the housing 120 at the first end 120d. The chamber 138 is cylindrical, and is sized to movably or slidably receive the actuator rod 122, and also receives the sensor 124. As the chamber 138 is fluidly coupled to the first inlet 130 and the second inlet 132, the chamber 138 defines the two pressure zones 138a, 138b, which are fluidly isolated in the first state.

The actuator rod 122 is movably or slidably coupled within the chamber 138 so as to be movable or slidable relative to the housing 120. The actuator rod 122 is composed of a metal or metal alloy, and may be cast, forged, machined, additively manufactured, etc. The actuator rod 122 includes a head 200 and a shaft 202, which are integrally formed. The actuator rod 122 also defines a central sensor bore 204, which extends from the head 200 toward an end 202a of the shaft 202. The central sensor bore 204 receives a portion of the sensor 124 to couple the sensor 124 to the actuator rod 122.

The head 200 is circular, and includes a first face 206, a second face 208, one seal 116g of the seals 116 and at least one cross-bore 212. The first face 206 is in contact with and responsive to the fluid received via the first inlet 130 and is disposed in the first pressure zone 138a of the chamber 138. The first face 206 includes a face flange 214 and a countersink 216. The face flange 214 extends axially from the first face 206 toward the stop 180. The face flange 214 is annular, and includes a lip 214a that extends radially from the face flange 214. The lip 214a is sized to be positioned substantially in contact with the housing 120 within the chamber 138 such that the lip 214a moves or slides along the housing 120 within the chamber 138. The lip 214a cooperates with the second face 208 to define a seal groove 218. The seal groove 218 is defined about the perimeter of the head 200 and receives the seal 116g. The seal 116g cooperates with the lip 214a and the second face 208 to ensure that the head 200 is substantially leak-proof in the first state. Stated another way, in the first state, the head 200 of the actuator rod 122 fluidly isolates the first pressure zone 138a from the second pressure zone 138b within the chamber 138. As will be discussed, in a second state, the head 200 of the actuator rod 122 enables bidirectional fluid communication between the first pressure zone 138a and the second pressure zone 138b such that the first fluid 112 and the second fluid 114 may flow through the head 200 to enable cooling.

The countersink 216 transitions the first face 206 into the central sensor bore 204. Generally, the countersink 216 is defined within the first face 206 to correspond with a shape of the sensor 124. The countersink 216 is defined about the longitudinal axis L, and is symmetric relative to the longitudinal axis L. As will be discussed, the at least one cross-bore 212 is defined through the first face 206 between the countersink 216 and the face flange 214.

The second face 208 is in contact with and responsive to the fluid received via the second inlet 132 and is disposed in the second pressure zone 138b of the chamber 138. The second face 208 is sized such that an outer perimeter 208a of the second face is positioned substantially in contact with the housing 120 within the chamber 138 such that the second face 208 also moves or slides along the housing 120 within the chamber 138. The second face 208 has an area, which is different and less than an area of the first face 206. The second face 208 cooperates with the lip 214a to define the seal groove 218. The second face 208 includes an annular protrusion 220. The annular protrusion 220 is symmetric about the longitudinal axis L and extends axially toward the second end 120c of the housing 120. As will be discussed, the at least one cross-bore 212 is defined through the second face 208 so as to pass through the annular protrusion 220.

The shaft 202 is integrally formed with, and extends axially from, the annular protrusion 220.

Figure 4:
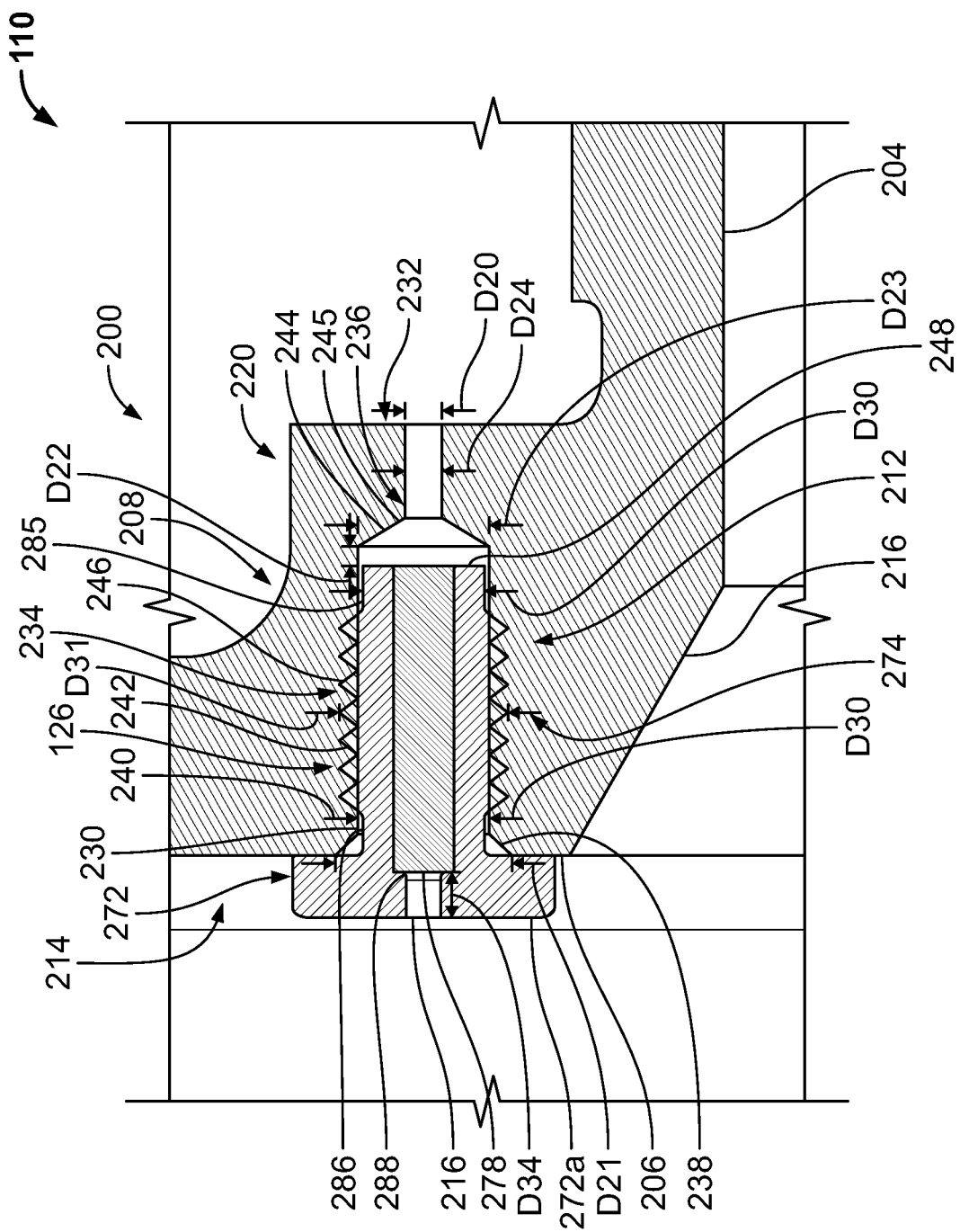
FIG. 4 is a detail view of a portion of a head of the actuator and the at least one plug, taken at 4 on FIG. 3.

The at least one cross-bore 212 is defined axially through the first face 206 and the annular protrusion 220 of the second face 208 so as to be radially offset from the longitudinal axis L. The at least one cross-bore 212 extends along an axis AC, which is parallel to the longitudinal axis L. In one example, the head 200 may include one to about three cross-bores 212. It should be noted, however, that the head 200 may include any number of cross-bores 212. Each of the cross-bores 212 receive a respective one of the plugs 126, and the plug 126 also extends along the axis AC. The cross-bores 212 and the plugs 126 are symmetric relative to the axis AC. As each of the cross-bores 212 and the plugs 126 are the same, a single cross-bore 212 and a single plug 126 will be illustrated and discussed in detail herein. With reference to FIG. 4, the cross-bore 212 and the plug 126 are shown in greater detail. The cross-bore 212 includes a first bore end 230, a second bore end 232, a plug receptacle 234 and a passageway 236. The first bore end 230 is defined at the first face 206. In one example, the first bore end 230 includes a chamfer 238. The chamfer 238 assists in defining a first plurality of threads 242 within the plug receptacle 234. The second bore end 232 is defined at the annular protrusion 220 of the second face 208. The second bore end 232 is opposite the first bore end 230. The second bore end 232 has a diameter D20, which is different and smaller than a diameter D21 of the first bore end 230.

The plug receptacle 234 extends from the chamfer 238 at the first bore end 230 toward the second bore end 232, and receives the plug 126. Thus, the plug 126 is not received through an entirety of the cross-bore 212. The plug receptacle 234 includes a first end 240, the first plurality of threads 242 and a countersink 244 at an opposite, second end 245. The chamfer 238 at the first bore end 230 transitions to the first end 240 of the plug receptacle 234. The first plurality of threads 242 are defined adjacent to the first end 240 and extend from the first end 240 toward the countersink 244. The first plurality of threads 242 are defined in the cross-bore 212 between the first face 206 and the second face 208. The first plurality of threads 242 are defined about the perimeter or circumference of the cross-bore 212 and engage with a second plurality of threads 246 of the plug 126. The plurality of threads 242, 246 assist in retaining the plug 126 within the cross-bore 212. In one example, the first plurality of threads 242 are defined along the cross-bore 212 between the first end 240 and the countersink 244 such that a distance D22 is defined between a second plug end 248 of the plug 126 and the countersink 244. In one example, the distance D22 is about 0.0 inches (in.) to about 0.05 inches (in.).

The countersink 244 transitions the plug receptacle 234 to the passageway 236. Stated another way, the plug receptacle 234 adjacent to the second plug end 248 has a first diameter D23, which is different and greater than a second diameter D24 of the passageway 236. The difference in the diameters D23, D24 assists with retaining a eutectic material 278 associated with the plug 126 within the plug 126. In this regard, the tapering of the plug receptacle 234 to the passageway 236 defined within the head 200 ensures that the pressure applied to the head 200 does not force the eutectic material 278 from the plug 126. As the plug 126 is fluidly coupled to or in fluid contact with the first fluid 112 and the second fluid 114, the plug 126 is exposed to the two different pressure zones 138a, 138b of the chamber 138. The reduced diameter of the cross-bore 212 at the passageway 236 proximate the second bore end 232 assists in inhibiting the eutectic material 278 from being removed from the plug 126 due to the different fluid pressures applied by the first fluid 112 and the second fluid 114 in the pressure zones 138a, 138b. In one example, the diameter D23 is about 0.100 inches (in.), and the diameter D24 is about 0.010 inches (in.) to about 0.040 inches (in.). It should be noted that the diameter D24 also defines the cooling flow rate of the first fluid 112 and/or the second fluid 114 through the head 200. The passageway 236 is defined within the annular protrusion 220, and extends from the countersink 244 to the second bore end 232. The passageway 236 enables the fluid to enter into the cross-bore 212 and fluidly couples the second pressure zone 138b to the plug 126.

With reference back to FIG. 3, the shaft 202 extends axially outward from the annular protrusion 220 of the second face 208. The shaft 202 includes a first shaft end 250 and an opposite second shaft end 252. The first shaft end 250 is coupled to or integrally formed with the annular protrusion 220, and may include a taper 250a that assists in transitioning from the annular protrusion 220 to the first shaft end 250. The second shaft end 252 includes a coupling feature 254 defined along an exterior of the shaft 202. In one example, the coupling feature 254 is a flange, which is substantially U-shaped. The coupling feature 254 defines a pair of apertures 256, which cooperate to receive a portion of the component 102 (FIG. 1) for coupling the component 102 to the actuator rod 122. It should be noted that the second shaft end 252 may have any desired configuration for coupling to the component 102 so that a movement of the actuator rod 122 results in a corresponding movement of the component 102 (FIG. 1). The second shaft end 252 also includes a sensor coupling recess 258 for coupling the sensor 124, in this example, a position sensor such as a linear variable differential transformer (LVDT), to the shaft 202. In this regard, the central sensor bore 204 is defined through the shaft 202, such that the shaft 202 is hollow from the first shaft end 250 to the second shaft end 252. The sensor coupling recess 258 is defined within the central sensor bore 204 proximate the coupling feature 254 at the second shaft end 252. In one example, the sensor coupling recess 258 includes a plurality of threads 260, which engage with a plurality of threads 262 of the sensor 124 to couple the sensor to the actuator rod 122. It should be noted that other techniques may be used to couple the sensor 124 to the actuator rod 122.

In one example, the sensor 124 is a position sensor that measures a displacement of the actuator rod 122, and in this example, is a linear variable differential transformer (LVDT). It should be noted that other techniques may be employed to measure a displacement or linear position of the actuator rod 122. The sensor 124 is in communication with the processor of the controller 103a and transmits one or more sensor signals that indicate a displacement of the actuator rod 122. In one example, the sensor 124 may include one or more electrical connections 124a, 124b that enable communication between the sensor 124 and the controller 103a. The electrical connections 124a, 124b and associated wiring may be coupled to a secondary housing 125. The secondary housing 125 is coupled to the housing 120 at the first end 120d, and receives a portion of the sensor 124. Based on the one or more sensor signals from the sensor 124, the controller 103a determines the position of the component 102 (FIG. 1). As LVDT sensors are generally known, the sensor 124 will not be described in detail herein. Briefly, the sensor 124 includes a coil assembly 264 and a movable core 266. The coil assembly 264 includes one or more coils 264a, which are contained in a coil housing 264b. The coil housing 264b is coupled to the first end 120d of the housing 120 and extends from the first end 120d of the housing 120 into the central sensor bore 204. The coil housing 264b includes one seal 116h of the seals 116, which inhibits fluid from flowing past the coil housing 264b within the central sensor bore 204. The movable core 266 is movable or slidable within a bore 264c defined in the coil housing 264b, and is movable within the secondary housing 125 and the housing 120. The movable core 266 includes a first core end 266a received within the bore 264c of the coil housing 264b and the secondary housing 125, and an opposite second core end 266b, which is coupled to the shaft 202. The second core end 266b is coupled to the sensor coupling recess 258, and includes the plurality of threads 262. In this example, the second core end 266b also includes a flange 266c to assist in coupling the second core end 266b to the shaft 202. Thus, the movement of the actuator rod 122 relative to the housing 120 causes a corresponding movement of the movable core 266, which generates the sensor signals that are communicated to the controller 103a to determine the position of the actuator rod 122, and thus, the component 102 (FIG. 1).

Figure 5:
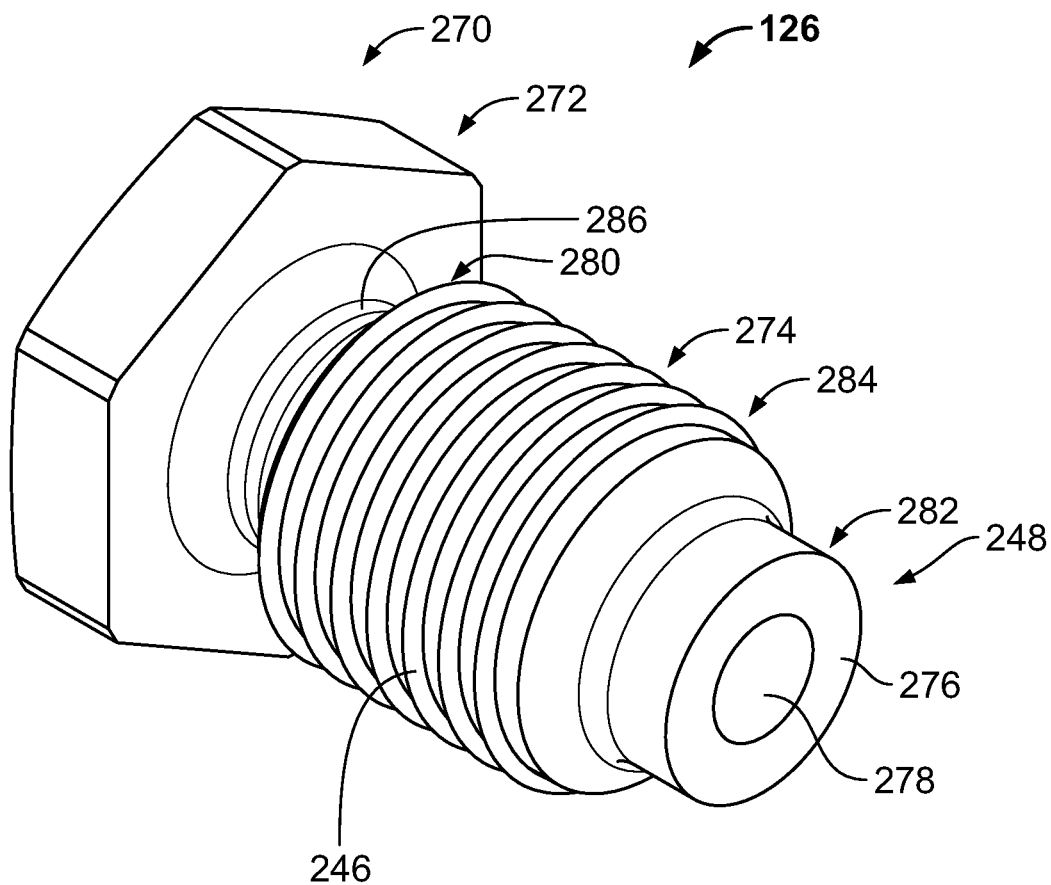
FIG. 5 is a perspective view of the at least one plug.

With reference back to FIG. 5, the plug 126 is shown in greater detail. The plug 126 includes a first plug end 270 opposite the second plug end 248, a plug head 272, a plug shaft 274, a central plug bore 276 and the eutectic material 278. The plug 126 is formed separately from the eutectic material 278, and may be composed of a metal or metal alloy that is different than the eutectic material 278. The plug 126 may be cast, forged, stamped, additively manufactured, etc. In one example, the plug 126 is composed of a metal or metal alloy, including, but not limited to alloys of Tin and Zinc, alloys of Tin and Lead, alloys of Tin and Silver, etc. Generally, the material of which the plug 126 and the eutectic material 278 is composed of is selected to be compatible with the first fluid 112 and the second fluid 114, and the material from which the plug 126 is composed has a melt temperature that is greater than a normal operating temperature of the actuator 110. The plug head 272 is at the first plug end 270. Generally, the plug head 272 or the first plug end 270 faces and is in fluid contact with the fluid received via the first inlet 130, while the plug shaft 274 or the second plug end 248 faces or is in fluid contact with the fluid received via the second inlet 132. Thus, the plug 126 has a pressure load acting on the plug 126 in both directions.

In one example, the plug head 272 is a hexagonal head, which enables a tool to be coupled to the plug head 272 for insertion and removal of the plug 126. It should be noted that the plug head 272 may be configured differently to mate with different tools, if desired. The plug shaft 274 extends from the plug head 272 to the second plug end 248, and is integrally formed with the plug head 272. The plug shaft 274 has a first end 280, an opposite second end 282 and a coupling portion 284. The first end 280 of the plug shaft 274 is integrally formed with the plug head 272, and the second end 282 defines the second plug end 248. The coupling portion 284 is defined between the first end 280 and the second end 282. With reference to FIG. 4, a groove 286 may be defined at the first end 280 of the plug shaft 274 at the interface between the plug head 272 and the plug shaft 274 for positioning the plug 126 within the cross-bore 212. In one example, the plug shaft 274 at the groove 286 has a diameter D30, which is different and less than a diameter D31 of the plug shaft 274 at the coupling portion 284 due to the difference in diameters of the plurality of threads 242, 246. This difference in the diameters D30, D31 assists coupling the plug 126 within the cross-bore 212. It should be noted that in other examples, the diameters D30, D31 may be the same.

The coupling portion 284 includes the plurality of threads 246 of the plug 126, which engage with the plurality of threads 242 of the cross-bore 212 to further retain the plug 126 within the cross-bore 212. The second end 282 of the plug shaft 274 defines the second plug end 248 of the plug 126, and faces the countersink 244 defined in the cross-bore 212. The plug shaft 274 may include a reduced diameter portion 285 between the coupling portion 284 and the second end 282. In one example, the reduced diameter portion 285 may have the diameter D30, which is different and less than the diameter D31 of the coupling portion 284. The reduced diameter portion 285 assists in locating the plug 126 within the cross-bore 212. Thus, the plurality of threads 242 are defined on the coupling portion 284 of the plug 126, which has the diameter D31 that is different than the adjacent portions of the plug 126 (the reduced diameter portion 285 and the groove 286).

The central plug bore 276 is defined through the plug 126 from the plug head 272 through the plug shaft 274 to the second plug end 248. The central plug bore 276 has a first diameter D32 at the first plug end 270 and transitions at a transition surface 288 within the plug head 272 to a second diameter D33, which is different and greater than the first diameter D32. The central plug bore 276 has the second diameter D33 from the transition surface 288 to the second plug end 248. In one example, the transition surface 288 is defined a distance D34 from an exterior surface 272a of the plug head 272. By defining the transition surface 288 within the interior of the plug head 272, an instrument, such as an injection device, may be inserted into the central plug bore 276 to fill the remainder of the central plug bore 276 with the eutectic material 278. In addition, the distance D34 enables excess eutectic material 278 to flow toward the first plug end 270. In this example, the transition surface 288 is defined as a countersink, which transitions from the first diameter D33 to the second diameter D34. The difference between the diameters D33, D34 assists in retaining the eutectic material 278 within the central plug bore 276. In this regard, as the central plug bore 276 is coupled to or in communication with the two pressure zones 138a, 138b, the smaller diameter of the first diameter D33 assists in retaining the eutectic material 278 within the central plug bore 276 when force is applied to the second plug end 248. Thus, the central plug bore 276 of the plug 126 and the second bore end 232 of the cross-bore 212 cooperate to retain the eutectic material 278 within the plug 126 while the plug 126 is fluidly coupled to and in contact with the two pressure zones 138a, 138b.

The eutectic material 278 is received within the central plug bore 276 from the transition surface 288 in the plug head 272 to the second plug end 248. The eutectic material 278 is disposed in the central plug bore 276 so as to extend through the central plug bore 276 from the plug head 272 to the plug shaft 274 in the first state. In one example, the eutectic material 278 is composed of a metal or metal alloy, including, but not limited to a Tin and Zinc alloy, which has a melting point of about 380 degrees Fahrenheit to about 400 degrees Fahrenheit. The melting point of the eutectic material 278 is generally less than the melting point of the plug 126. Generally, the eutectic material 278 is received within the central plug bore 276 such that a majority or greater than about 50% to about 100% of the central plug bore 276 is filled with the eutectic material 278. In a first state, in which the eutectic material 278 is in a solid state, the eutectic material 278 fluidly isolates the fluid in the first pressure zone 138a from the fluid in the second pressure zone 138b as the eutectic material 278 obstructs the flow of fluid through the central plug bore 276.

Figure 6:
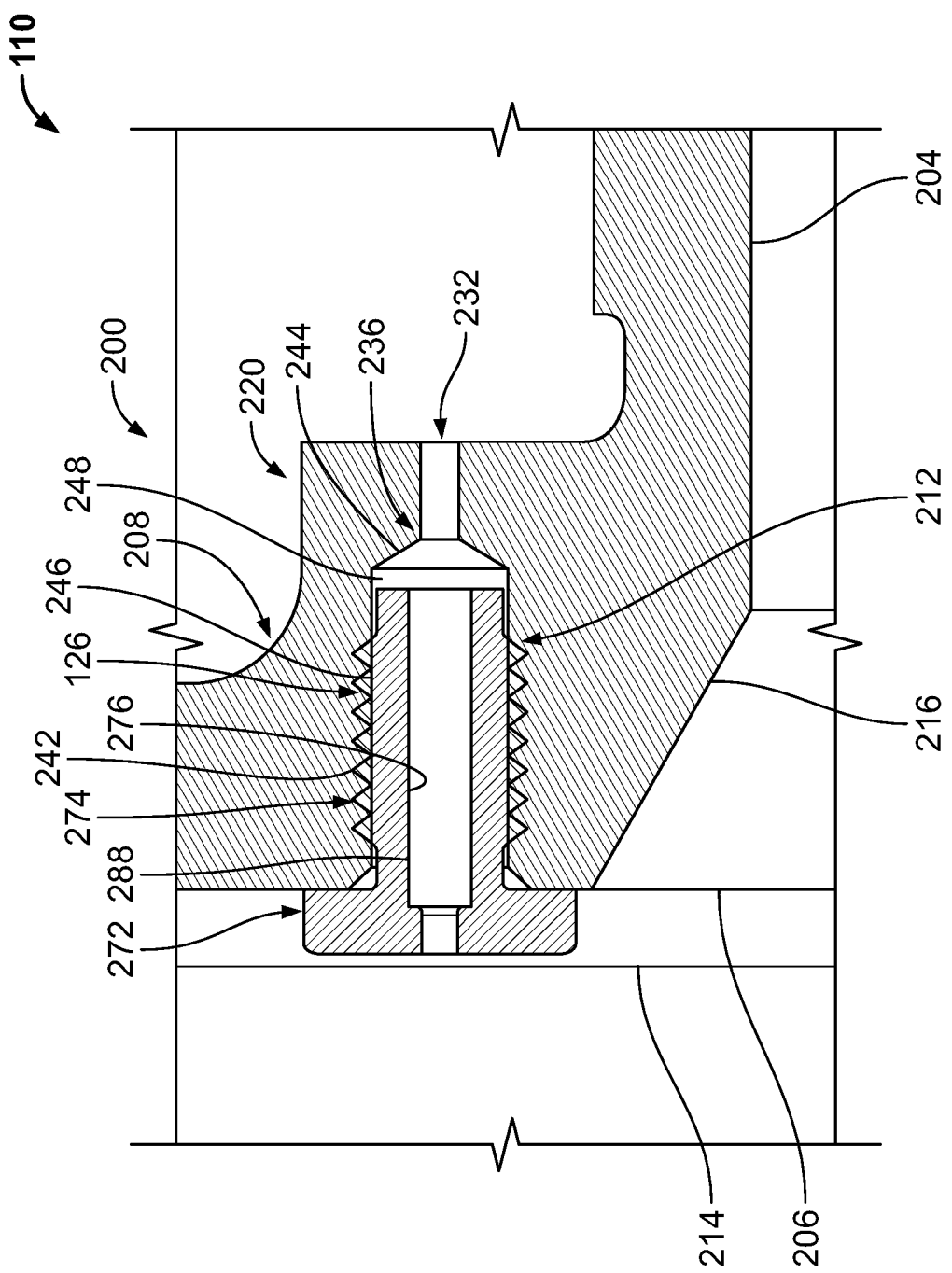
FIG. 6 is a detail view of a portion of a head of the actuator and the at least one plug, taken from the perspective of 4 on FIG. 3, in which the at least one plug is in the second state.

With reference to FIG. 6, in a second state, in which the eutectic material 278 is melted, the central plug bore 276 is unobstructed or defines an open passageway such that the first fluid 112 and/or the second fluid 114 may flow between the first pressure zone 138a and the second pressure zone 138b through the head 200 to provide cooling for the seals 116. Thus, in the first state (FIG. 4), the eutectic material 278 of the plug 126 inhibits leaks of the fluid from the first pressure zone 138a to the second pressure zone 138b through the head 200, which improves an efficiency of the positioning of the actuator rod 122. Stated another way, with the eutectic material 278 removed (FIG. 6), additional fluid from the first pump 106a associated with the first fluid source 106 and/or the second pump 108a associated with the second fluid source 108 may be required to control the position of the actuator rod 122 as the first fluid 112 and/or the second fluid 114 flow through the central plug bore 276. In the first state, the eutectic material 278 of the plug 126 fluidly isolates the fluid within the first pressure zone 138a and the second pressure zone 138b of the chamber 138 (FIG. 4), while in the second state, the first fluid 112 and the second fluid 114 flow through the central plug bore 276 to provide cooling for at least the seals 116 (FIG. 6). It should be noted that as the first inlet 130 and the second inlet 132 are independently supplied by the valve 109, the pressure within the chamber 138 acting on the first face 206 and the second face 208 remains the same in the second state.

In one example, with reference to FIG. 3, in order to assemble the actuator 110, the plug 126 is formed and the eutectic material 278 is injected or otherwise inserted within the central plug bore 276 so as to seal the central plug bore 276 and couple the eutectic material 278 to the plug 126. With the actuator rod 122 formed, the plug 126 is inserted into and threadably coupled to the cross-bore 212. The seal 116g is coupled to the head 200. With the housing 120 formed, the bushing 172 including the seal 116d is coupled to the housing 120, and the retaining ring 174 and the seal 116i are coupled to the housing 120 to retain the bushing 172 within the housing 120. The second bushing 178 and the seal 116e are each coupled to the housing 120. The movable core 266 of the sensor 124 is coupled to the shaft 202 of the actuator rod 122, and the coil housing 264b, with the seal 116d, is positioned within the central sensor bore 204. The actuator rod 122 is inserted into the housing 120 such that the shaft 202 extends through the bushings 172, 178 and the head 200 is positioned within the chamber 138. The stop 180 is coupled to the housing 120 to enclose the chamber 138. With the couplings 150, 154, 162 coupled to the first inlet 130, the second inlet 132 and the drain outlet 134, the first inlet 130 and the second inlet 132 are fluidly coupled to the valve 109, and the drain outlet 134 is fluidly coupled to the drain conduit 159. The valve 109 is fluidly coupled to the first fluid source 106 and the second fluid source 108. The actuator 110 is installed on the gas turbine engine 103, and the coupling feature 254 of the actuator rod 122 is coupled to the component 102 (FIG. 1).

With the actuator 110 installed on the gas turbine engine 103 and coupled to the component 102 (FIG. 1), in order to control the position of the component 102, the controller 103a (FIG. 1) may output one or more control signals to the first pump 106a associated with the first fluid source 106 to dispense a predetermined amount of the first fluid 112 at the first pressure to the valve 109. The controller 103a (FIG. 1) may also output one or more control signals to the second pump 108a associated with the second fluid source 108 to dispense a predetermined amount of the second fluid 114 at the second pressure to the valve 109. In one example, the valve 109 is responsive to one or more control signals from the controller 103a to direct the first fluid 112 to the first inlet 130 and to direct the second fluid 114 to the second inlet 132. The first fluid 112 flows through the first inlet 130 and acts on the first face 206 to move or slide the actuator rod 122 relative to the housing 120 in the first direction DF, which results in a corresponding movement of the component 102 (FIG. 1). The valve 109 is also responsive to one or more control signals from the controller 103a to direct the first fluid 112 to the second inlet 132 and to direct the second fluid 114 to the first inlet 130. The first fluid 112 flows through the second inlet 132 and acts on the second face 208 to move or slide the actuator rod 122 relative to the housing 120 in the second direction DR opposite the first direction DF, which results in a corresponding movement of the component 102 (FIG. 1). Thus, the application of the first fluid 112 and the second fluid 114 to the actuator rod 122 controls the position of the component 102 (FIG. 1).

In the first state, the eutectic material 278 fluidly isolates the fluid within the first pressure zone 138a from the fluid within the second pressure zone 138b within the chamber 138. Once a temperature of the actuator rod 122 exceeds the melt temperature of the eutectic material 278, the eutectic material 278 melts and the plug 126 is in the second state. In the second state, the first fluid 112 and/or the second fluid 114 flow through the central plug bore 276 to provide cooling for the seals 116. Generally, the fluid 112,114 in the pressure zones 138a, 138b flows through the central plug bore 276 in the second state based on which of the first inlet 130 and the second inlet 132 is being actively supplied by the valve 109 to move the actuator rod 122. As the fluid 112, 114 received from the valve 109 has a lower temperature than the fluid in the chamber 138, the fluid 112, 114 received from the valve 109 lowers the temperature of the fluid within the chamber 138. Generally, once the eutectic material 278 is removed from or melts within the plug 126 to define the second state, the actuator rod 122 is removed from the actuator system 100 and replaced.

By providing the plug 126 with the eutectic material 278 disposed in the central plug bore 276, the plug 126 enables leakproof operation of the actuator rod 122 in the first state, and enables the first fluid 112 and/or the second fluid 114 to leak or flow through the head 200 in the second state to provide for cooling of the seals 116 during a thermal event or an abnormal operation of the actuator 110. Thus, the actuator 110 with the thermal resistance provided by the plug 126 extends a life of the seals 116, and also provides for improved accuracy and efficiency in the control of the position of the component 102 (FIG. 1) during normal operation of the actuator 110. Further, the plug 126 does not significantly increase a weight of the actuator 110, and moreover, the plug 126 provides for ease of assembly and handling of the actuator 110 during installation into the gas turbine engine 103. In addition, the actuator rod 122, including the plug 126, may be retrofitted into current actuator systems, which will improve performance by reducing a load on pumps associated with the actuator systems by reducing flow required by the actuator system during normal operation as the plug 126 results in leakproof operation. It should be noted that while the plug 126 is described and illustrated herein as being coupled to the head 200 of the actuator rod 122, the plug 126 may be positioned at another location on the actuator rod 122 so long as the plug 126 fluidly isolates the first pressure zone 138a from the second pressure zone 138b in the first state.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An actuator, comprising:
   a housing that defines a first inlet configured to receive a fluid, a second inlet configured to receive the fluid and a chamber fluidly coupled to the first inlet and the second inlet;
   an actuator rod movably coupled to the housing, the actuator rod including a head movably disposed in the chamber, the head having a first face opposite a second face, the first face configured to be responsive to the fluid from the first inlet to move the actuator rod relative to the housing, the second face configured to be responsive to the fluid from the second inlet to move the actuator rod relative to the housing, and the head defines at least one cross-bore that extends through the first face and the second face; and
   at least one plug coupled to the at least one cross-bore configured to inhibit a flow of the fluid through the at least one cross-bore in a first state such that the at least one plug fluidly isolates the fluid from the first inlet from the fluid from the second inlet within the chamber in the first state, the at least one plug is configured to enable the flow of the fluid through the at least one plug in a second state, the at least one plug defines a central plug bore and a eutectic material is disposed in the central plug bore in the first state, and in the second state, the eutectic material is removed to enable the flow of the fluid through the central plug bore.

2. The actuator of claim 1, further comprising a first fluid source configured to supply the fluid at a first pressure, a second fluid source configured to supply the fluid at a second pressure, a valve fluidly coupled to the first fluid source, the second fluid source, the first inlet and the second inlet, the valve configured to supply the fluid at one of the first pressure and the second pressure to the first inlet and to supply the fluid at the other of the first pressure and the second pressure to the second inlet, and the second pressure is different than the first pressure.

3. The actuator of claim 1, wherein the at least one plug transitions from the first state to the second state based on a temperature associated with the actuator rod.

4. The actuator of claim 1, wherein the at least one plug is offset from a longitudinal axis of the actuator rod.

5. The actuator of claim 1, wherein the at least one plug includes a plug head and a plug shaft, and the plug shaft cooperates with the at least one cross-bore to retain the at least one plug within the at least one cross-bore.

6. The actuator of claim 5, wherein the plug head is configured to be in contact with the fluid from the first inlet, and the plug shaft is configured to be in contact with the fluid from the second inlet.

7. The actuator of claim 4, wherein the at least one cross-bore defines a plurality of threads between the first face and the second face, and the at least one plug includes a second plurality of threads to couple the at least one plug to the at least one cross-bore.

8. The actuator of claim 5, wherein the central plug bore transitions from a first diameter to a second diameter within the plug head, and the second diameter is greater than the first diameter to retain the eutectic material within the central plug bore.

9. The actuator of claim 1, wherein the at least one cross-bore has a first diameter at the first face, a second diameter at the second face, and the second diameter is different than the first diameter to retain the eutectic material within the central plug bore.

10. The actuator of claim 7, wherein the second plurality of threads are defined on the at least one plug on a portion of the at least one plug that has a diameter that is different than an adjacent portion of the at least one plug.

11. The actuator of claim 9, wherein the second diameter is less than the first diameter.

12. The actuator of claim 1, wherein the second face includes an annular protrusion that extends axially, and the at least one cross-bore is defined through the first face and extends through the annular protrusion of the second face.

13. The actuator of claim 1, wherein the actuator further comprises a sensor, and the actuator rod includes a shaft coupled to the head, with a central bore defined through the actuator rod from the head toward an end of the shaft, and the sensor is at least partially received within the central bore.

14. The actuator of claim 1, wherein the housing further comprises a drain chamber defined within the housing proximate the chamber that is configured to receive the fluid from the chamber and a drain outlet is fluidly coupled to the drain chamber to drain the fluid from the housing.

15. The actuator of claim 1, wherein the actuator rod includes a shaft coupled to the head, and the shaft includes a flange configured to couple to a component associated with a gas turbine engine.

16. An actuator system for a gas turbine engine, comprising:
   a first fluid source that is configured to supply a fluid at a first pressure;
   a second fluid source that is configured to supply the fluid at a second pressure, the second pressure different than the first pressure; and
   an actuator having a housing that defines a first inlet configured to receive the fluid, a second inlet configured to receive the fluid and a chamber fluidly coupled to the first inlet and the second inlet, the actuator including an actuator rod movably coupled to the housing that extends along a longitudinal axis, the actuator rod including a head movably disposed in the chamber, the head having a first face opposite a second face, the first face configured to be responsive to the fluid from the first inlet to move the actuator rod relative to the housing, the second face configured to be responsive to the fluid from the second inlet to move the actuator rod relative to the housing, and the head defines at least one cross-bore that extends through the first face and the second face, the at least one cross-bore extends along an axis parallel to the longitudinal axis, and at least one plug coupled to the at least one cross-bore is configured to inhibit a flow of the fluid through the at least one cross-bore in a first state such that the at least one plug fluidly isolates the fluid from the first inlet from the fluid from the second inlet within the chamber in the first state, the at least one plug is configured to enable the flow of at least one of the fluid through the at least one plug in a second state and the at least one plug transitions from the first state to the second state based on a temperature associated with the actuator rod.

17. The actuator system of claim 16, wherein the at least one plug includes a plug head, a plug shaft and defines a central plug bore that extends through the at least one plug from the plug head to the plug shaft, a eutectic material is disposed in the central plug bore so as to extend through the central plug bore from the plug head to the plug shaft in the first state, and in the second state, the eutectic material is removed to enable the flow of the fluid through the central plug bore.

18. The actuator system of claim 17, wherein the at least one cross-bore has a first diameter at the first face, a second diameter at the second face, and the second diameter is less than the first diameter to retain the eutectic material within the central plug bore.

19. The actuator system of claim 17, wherein the plug head is configured to be in contact with the fluid from the first inlet, the plug shaft is configured to be in contact with the fluid from the second inlet.

20. The actuator system of claim 17, wherein the central plug bore transitions from a first diameter to a second diameter within the plug head, and the second diameter is greater than the first diameter to retain the eutectic material within the central plug bore.

* * * * *